US006117579A

United States Patent [19]
Gyoten et al.

[11] Patent Number: 6,117,579
[45] Date of Patent: Sep. 12, 2000

[54] POLYMER ELECTROLYTE FUEL CELL

[75] Inventors: Hisaaki Gyoten, Shijonawate; Takaharu Gamou, Fujiidera; Kazuhito Hatoh, Daitou; Eiichi Yasumoto, Katano, all of Japan

[73] Assignee: Matsushita Electric Industrial Co., Ltd., Osaka, Japan

[21] Appl. No.: 09/049,649

[22] Filed: Mar. 24, 1998

[30] Foreign Application Priority Data

Mar. 25, 1997 [JP] Japan ................................ 9-071814

[51] Int. Cl.$^7$ ................................................ H01M 8/10
[52] U.S. Cl. .................. 429/30; 429/34; 429/35; 429/38; 429/39; 429/40; 429/41; 429/42; 429/44
[58] Field of Search .................... 429/30, 33, 34, 429/35, 38, 39, 40, 41, 42, 44

[56] References Cited

U.S. PATENT DOCUMENTS

| | | |
|---|---|---|
| 3,418,168 | 12/1968 | Wentworth . |
| 5,292,600 | 3/1994 | Kaufman .................. 429/40 |
| 5,607,785 | 3/1997 | Tozawa et al. . |

FOREIGN PATENT DOCUMENTS

| | | |
|---|---|---|
| 389020 | 8/1986 | Austria . |
| 0560295 | 3/1993 | European Pat. Off. . |
| 3323491 | 6/1983 | Germany . |
| 60181292 | 9/1985 | Japan . |
| 04012462 | 1/1992 | Japan . |
| 07105957 | 4/1995 | Japan . |
| 07320753 | 12/1995 | Japan . |
| 08167416 | 6/1996 | Japan . |
| WO 96/00453 | 1/1996 | WIPO . |

*Primary Examiner*—Bruce F. Bell
*Attorney, Agent, or Firm*—McDermott, Will & Emery

[57] ABSTRACT

The present invention is for facilitating a removal of water around the catalytic layers of a polymer electrolyte fuel cell and for providing a polymer electrolyte fuel cell which can prevent from drop in output performance caused by excessive wetting of electrode layers due to a long-hour operation or a large current ouputting operation. The polymer electrolyte fuel cell according to the present invention uses an electrode layer having a water repellent porous base area and penetration areas which are higher in water permeability than in the base area. Such base area and penetration areas are formed as by imparting water repellency unevenly on a hydrophilic pore material, for example.

19 Claims, 4 Drawing Sheets

POLYMER ELECTROLYTE FUEL CELL

BACKGROUND OF THE INVENTION

The present invention relates to a normal temperature-operating electrolyte fuel cell for use in such applications as a portable power source, an electric vehicle and a home powder source system.

The normal temperature-operating polymer electrolyte fuel cell generates electricity by electrochemically reacting a fuel gas such as hydrogen and an oxidizer gas such as oxygen. The heat, which simultaneously comes out in the reaction, is also made good use of.

The basic construction composing a polymer electrolyte fuel cell is configured as in the following, for example. A polymer electrolyte film is made of a hydrogen ion conductive resin such as a fluorocarbon resin having a sulfo group. A catalytic layer substantially made of a carbon powder with a platinum group metal catalyst carried thereon is formed closely on each surfaces of the polymer electrolyte film. Furthermore, a gas-permeable and electrically conductive electrode layer is provided directly on the outer surface of each catalytic layer. On the outer surface of the electrode layer, an electrically conductive separator is provided to mechanically clamp the assembly composed of the electrode layers and the polymer electrolyte film and to electrically connect the assembly with the adjoining assembly in series. A groove-shaped channel to evenly supply the gas to the electrode layer is formed on the surface of the separator facing the electrode layer. The fuel gas is supplied to one of the pair of the electrode layers, and the oxidizer gas is supplied to the other. Hereafter described an arrangement in which hydrogen is used as the fuel gas and oxygen as the oxidizer gas.

A hydrogen gas supplied from outside is taken in the electrode layer on the hydrogen gas supplying side or the anode while passing along the surface of the electrode layer. The hydrogen gas taken in the electrode layer diffuses and passes through the electrode layer, then reaches the catalytic layer. When the hydrogen gas flows inside the catalytic layer and reaches a region where the polymer electrolyte coexists, an electrochemical reaction is caused between the hydrogen gas and the polymer electrolyte. The hydrogen gas is ionized by the reaction, and the generated hydrogen ions are taken into the polymer electrolyte film.

On the other hand, an oxygen gas supplied from outside is taken in the electrode layer on the oxygen gas supplying side or the cathode while passing along the surface of the electrode layer. The oxygen gas diffuses and passes through the electrode layer, then reaches the catalytic layer on the cathode side. Then, the oxygen gas turns into water vapor by reacting with hydrogen ions drifting from the anode through the electrolyte film. In this reaction, the electrons migrate from the anode to the cathode through an external load connected to the fuel cell. This migration of the electrons is utilized as an electric power. This electrochemical reaction between hydrogen and oxygen further produces heat. Therefore, a cooling water is circulated through the inside of the fuel cell to keep the temperature of the fuel cell low, and the warmed water is utilized as a thermal energy.

The polymer electrolyte fuel cell is usually operated in a temperature range from a room temperature to about 80° C. Therefore, the water vapor generated by the electrochemical reaction on the catalytic layer on the cathode side mostly condenses into dew around the catalytic layer. When the condensed water remains around the catalytic layer, the oxygen gas is prevented from reaching the reaction area or the catalytic layer, and hence the cell performance is lowered. On the anode side, meanwhile, no water is generated. However, in a case the water generated on the cathode side permeates through the polymer electrolyte film and penetrates into the catalytic layer, or in a case the water vapor which is previously mixed into the fuel gas to prevent the electrolyte film from drying up condenses into dew and remains on the catalytic layer, the supply of hydrogen to the reaction area is blocked and the cell performance is dropped.

To solve the problems, various countermeasures have been proposed and tried, which include a water-repellent finish of the electrode layers to maintain the reaction area or the catalytic layers in a good wet condition, and an increased flow velocity of the gas flowing along the surface of the electrode layers so as to remove an excessive water sticking to the electrode layers.

However, the employment of the water repellent finished electrode layer causes a problem of hardly removing the water, resulting in a decreased cell performance, under some operating conditions as, for example, a high current density output operation which generates a large quantity of water or a low gas flow velocity operation. In some serious cases, the gas channels on the surfaces of the electrode layers are clogged, with the output of the cell dropping to zero.

BRIEF SUMMARY OF THE INVENTION

It is an object of the present invention to solve the foregoing problem and to provide a polymer electrolyte fuel cell which can facilitate a removal of water around the catalytic layer of the cell, thereby to prevent the cell performance from dropping due to excessive wetting of the electrode layer as in the longhour operation or the high current density output operation.

The present invention provides a polymer electrolyte fuel cell comprising:

a plurality of assemblies, each assembly including a polymer electrolyte film with hydrogen ion conductivity and a pair of electrode layers sandwiching the polymer electrolyte film therebetween; and a plurality of electrically conductive separators, each separator being piled alternately with the assembly and including a gas supply channel to supply a gas to the electrode layer and a gas outlet channel for discharging a gas from the electrode layer, wherein the electrode layer comprises a porous base area with water repellency and a penetration area higher in water permeability than in the base area.

In a preferred mode of the polymer electrolyte fuel cell of the present invention, the electrode layer is mainly composed of the porous base area and a plurality of the penetration areas which are scattered over the base area.

In another preferred mode of the polymer electrolyte fuel cell of the present invention, the penetration area is formed through the electrode layer.

The foregoing base area and penetration areas can be formed, for example, by adding water-repellency to a hydrophilic porous material unevenly and ununiformly. Most of the electrode layer surface is water repellent finished, however the scattering untreated areas or the penetration areas are also provided sparsely. The water repellent finish is carried out with a water repellent agent containing a fluorocarbon resin, for example.

While the prior art water repellent finish has been effected uniformly all over the surface of the electrode layer, the present invention uses the uneven water repellent finish to realize coexistence of the water-repellent area and the untreated areas in the porous material formed. This facilitates the oozing of water generated on the catalytic layer into the gas channels through the untreated areas. The random scattering of the wet spots or the water repellent areas wherein water lie stagnant and the gas-flowing spots or the untreated areas accelerates the gas flow velocity. This, it is considered, makes it easy to remove excessive water being stagnate within the electrodes.

The penetration areas can be formed of holes made by perforating through the electrode layer excepting the gas permeable pores originally possessed by the porous material. Since water tends to penetrate through larger openings in the water repellent porous material, the excessive water oozes through the formed holes. As a result, the removal of water by the gas flow is facilitated.

Even if the penetration areas are water repellent, in the case that the penetration areas has larger pores than those in the base area, water drops penetrate the pores in the penetration areas and thus the same results can be obtained.

When the penetration areas are arranged on the electrode layer so as to face the gas channel, more preferably along the center line of the gas channel where the gas flow velocity is high, water can be removed more efficiently thereby obtaining higher effects.

The present invention also provides a polymer electrolyte fuel cell comprising an electric generator including:

a plurality of assemblies, each assembly including a polymer electrolyte film with hydrogen ion conductivity and a pair of electrode layers sandwiching the polymer electrolyte film therebetween; and a plurality of electrically conductive separators, each separator being piled alternately with the assembly and including a gas supply channel to supply a gas to the electrode layer and a gas outlet channel for discharging a gas from the electrode layer, and further comprising a vibrator for applying a vibration to the electric generator.

In a preferred mode of the polymer electrolyte fuel cell according to the present invention, the vibrator is an ultrasonic vibrator which produces vibration intermittently or interlocked with the cell performance. Applying vibration with a relatively low frequency is more effective in removal of the water which overflows and blocks the gas channels than the water which blocks the permeable pores in the electrode. Vibration with a high frequency like ultrasonic, on the other hand, can remove the water which blocks the permeable pores in the electrode more efficiently.

The present invention further provides a polymer electrolyte fuel cell comprising an electric generator including:

a plurality of assemblies, each assembly including a polymer electrolyte film with hydrogen ion conductivity and a pair of electrode layers sandwiching the polymer electrolyte film therebetween; and a plurality of electrically conductive separators, each separator being piled alternately with the assembly and including a gas supply channel to supply a gas to the electrode layer and a gas outlet channel for discharging a gas from the electrode layer, and further comprising a gas compressor for intermittently compressing the gas to be supplied to the gas supply channel.

Since the velocity of the gases flowing along the catalytic and the electrode layers can be raised temporarily by providing a compressor on the gas supply means and by intermittently increasing the gas flow velocity, stagnating condensed water can be removed efficiently.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
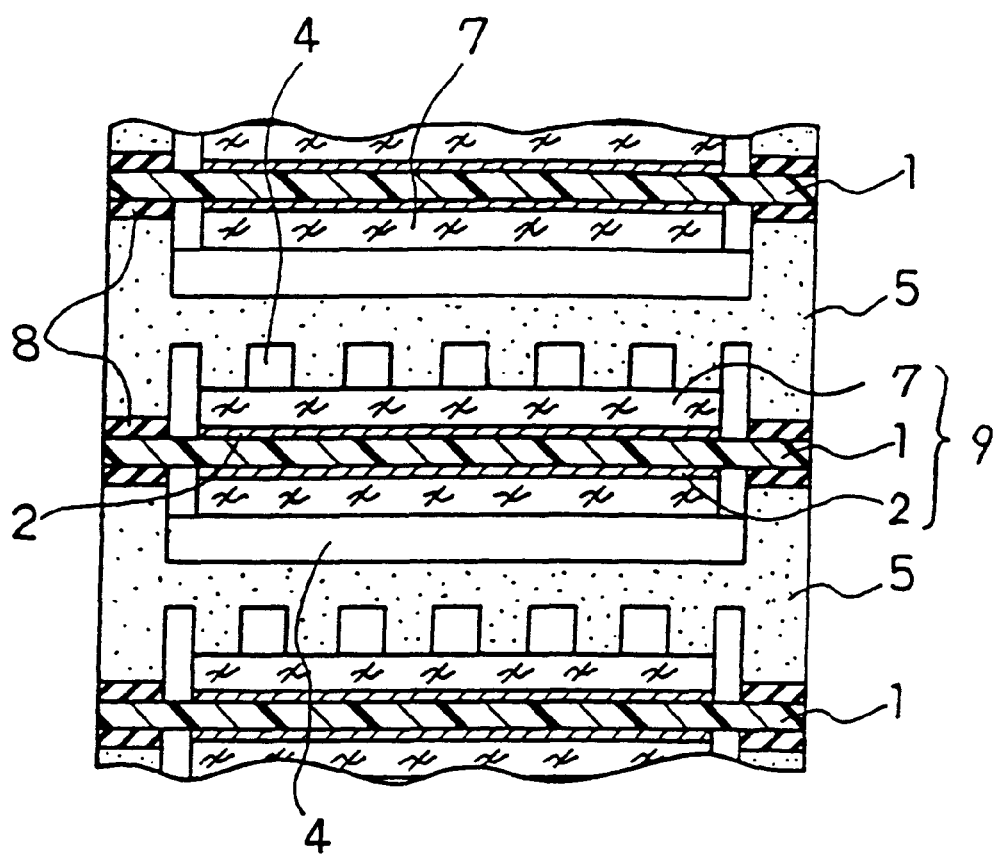
FIG. 1 is a cross-sectional view showing the main part of the polymer electrolyte fuel cell in an embodiment of the present invention.

Preferred embodiments of the present invention are hereinafter described in detail with reference to the attached drawings.

EMBODIMENT 1

A carbon powder with a particle diameter of several um was dipped in an aqueous solution of chloroplatinic acid. The carbon powder was then subjected to a reduction treatment to carry a platinum catalyst thereon. The ratio of the carbon powder to the carried platinum was 1 to 1 by weight. The carbon powder with platinum was then dispersed in an alcoholic solution of a polymer electrolyte to give a slurry.

Meanwhile, an aqueous dispersion of a fluorocarbon resin ("Neofreon ND-1" manufactured by Daikin Industries, Ltd., Japan) was applied by splashing onto the both surfaces of a carbon unwoven fabric with a thickness of 400 $\mu$m to be employed as an electrode so that the surfaces of the carbon unwoven fabric were coated unevenly with the fluorocarbon resin powder. The carbon unwoven fabric was then dried, followed by a heat treatment at 400° C. to produce a carbon unwoven fabric electrode.

The obtained carbon unwoven fabric electrode as a whole showed water repellency when wetted with water, but the water penetrated inside in time. By a microscopic observation of the surface and the section of the carbon unwoven fabric electrode, it was confirmed that there were scattered regions 30 $\mu$m to several mm in width where no fluorocarbon resin is applied.

In parallel with that, the same kind of carbon unwoven fabric was uniformly coated with the aqueous dispersion of the fluorocarbon resin and heat-treated. When this unwoven fabric was wetted with water, large water drops were formed on the surface of the unwoven fabric and would not penetrate inside even in part.

One surface of each carbon unwoven fabric electrode thus water repellent finished was coated uniformly with the aforementioned slurry containing carbon powder and then dried to form a catalytic layer. A polymer electrolyte film 1 with a thickness of 50 $\mu$m made of a fluorocarbon resin having a sulfo group was sandwiched between two pieces of the carbon unwoven fabric electrodes 7 so placed as to face the catalytic layer 2 to other. They were then dried to obtain an assembly 9 shown in FIG. 1. The carbon unwoven fabric electrodes 7 were 5 cm in length and width, while the polymer electrolyte film 1 was 8 cm in length and width. The carbon unwoven fabric electrodes 7 were put in the center of the polymer electrolyte film 1. In the assembly 9 thus obtained, it was confirmed that the polymer electrolyte film 1 and the carbon unwoven fabric electrode 7 were firmly bonded to each other via the catalytic layer 2 where the platinum-carrying carbon powder and the polymer electrolyte coexisted.

The assemblies 9 and an airtight carbon separator plates 5 were piled alternately to give a three-cell unit as shown in FIG. 1. The separator plate 5 was 4 mm in thickness and has a plurality of channels 4 of 1 mm in width and depth, provided in one direction by cutting the surface thereof. A seal material 8 was interposed between the separator plate 5 and the polymer electrolyte 1 to provide an electrical insulation therebetween and to prevent leakage of the gases inside.

End plates, which also serve as cooling plates, were placed on the both ends of the piled cells and the three cells were pressed and clamped under a pressure of 10 kgf/cm$^2$ in the piled direction. Characteristics tests were carried out with thus obtained three-cell unit as follows. A hydrogen gas as a fuel gas was supplied to the anode with the utilization of 60%. On the other hand, an air as an oxidizer gas was supplied to the cathode with the utilization of 20%. A temperature controller was provided on each gas supply unit, which was so set that the temperature of the supply gas was, in principle, identical with that of the cell. A humidifier is also provided on each gas supply unit, and the humidity was so adjusted that the dew point of the supply gas was 15 to 35° C. lower than the cell temperature.

Figure 2:
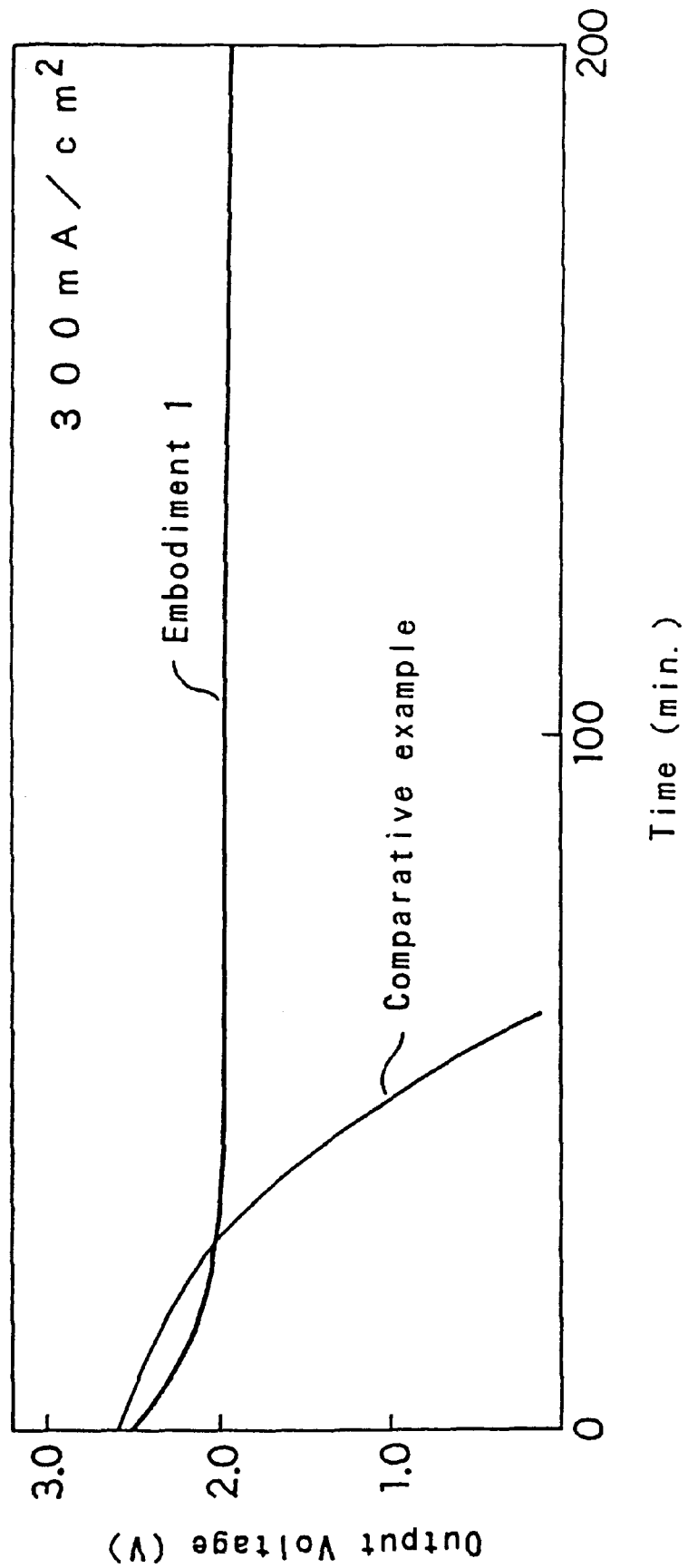
FIG. 2 is a characteristics diagram showing the change with time in the output voltage of the same polymer electrolyte fuel cell.

FIG. 2 shows the characteristics change with time when the three-cell unit of the present embodiment was operated with an output current density of 300 mA/cm$^2$. FIG. 2 also shows the characteristics of the prior art three-cell unit with the uniformly water repellent finished electrodes as a comparative example. The output voltage of the comparative example dropped sharply 30 minutes after the start of operation and ran out of power some 60 minutes later. The three-cell unit of the present embodiment, on the other hand, maintained the performance high for a long time though the output dropped slightly in the initial stage.

EMBODIMENT 2

Another method of providing the electrode layers with an uneven water repellent finish will be described in the present embodiment.

A paraffin powder with a melting point of 60 to 90° C. and a particle diameter of 0.01 to 0.2 mm was scattered over the surface of a carbon unwoven fabric 400 μm in thickness. The unwoven fabric was then stored for 30 minute in a thermostatic chamber maintained at 120° C. The paraffin powder scattered on the unwoven fabric melted and penetrated into the unwoven fabric by the heat treatment. The unwoven fabric was then taken out of the thermostatic chamber and was allowed to cool to a room temperature. An observation of this unwoven fabric confirmed penetrations of paraffin in the shape of cylinder 0.02 to 1 mm in diameter through the unwoven fabric.

This unwoven fabric was dipped in the same aqueous dispersion of fluorocarbon resin powder as used in Embodiment 1 and dried. The material was then subjected to a heat treatment for some one hour at 400° C. Paraffin evaporates in the initial stage of such heat treatment, and the fluorocarbon resin powder which has stuck to the unwoven fabric by the dipping peels off in the heat treatment. Thus, the areas where paraffin stuck on the unwoven fabric are left uncoated with fluorocarbon resin in the heat treatment. On the areas with no paraffin, on the other hand, the fluorocarbon resin powder sticks directly to the unwoven fabric when the material is dipped in the dispersion. The fluorocarbon resin sticking directly to the fabric melts thereby forming a water repellent coating on the unwoven fabric by the heat treatment. In the unwoven fabric thus treated, the water repellent areas and the highly wettable areas coexist, each extending from one surface to the other.

When the treated unwoven fabric was actually wetted with water on the surface, it was confirmed that water passed from one side to the other through the highly wettable areas where no fluorocarbon resin was coated. A three-cell unit was assembled using the water repellent finished unwoven fabric in the same manner as in Embodiment 1. The obtained three-cell unit was operated with an output current density of 300 mA/cm$^2$ in the same way as in Embodiment 1. As a result, a stable output voltage continued for not shorter than 1,000 minutes.

EMBODIMENT 3

In the present embodiment, there will be explained a method of controlling the water permeability of the electrode layer through the pore diameter of a water repellent porous material.

A carbon unwoven fabric 400 μm in thickness was coated with fluorocarbon resin by dipping in the same aqueous dispersion of fluorocarbon resin powder as used in Embodiment 1. The unwoven fabric was then heat-treated for some one hour at 400° C. to form a fluorocarbon resin coating on the surface.

The unwoven fabric thus uniformly water repellent finished was roughly loosened into small pieces. These small pieces were immersed into an aqueous solution containing proper amounts of a surfactant and carboxymethylcellulose as a binder, then the solution was stirred. When the solution was stirred, some of the unwoven fabric pieces broke up into single fibers, but other fibers remained in lumps.

Those fibers were refabricated into a unwoven fabric. The remade unwoven fabric had two types of regions, dense regions made up of fibers that had not been dispersed by the foregoing stirring and coarse regions formed of fibers that had been dispersed apart by the stirring and reassembled.

In water repellent porous materials as the aforementioned unwoven fabric, the water permeability depends on the diameter of pores on the surface. That is to say, the larger the diameter, the easier the water penetration. In the foregoing unwoven fabric, the water permeability on the coarse regions is higher than that on the dense regions, and water sticking to the surface of such porous material tends to move toward the coarse regions.

A polymer electrolyte fuel cell was assembled using the remade unwoven fabric in the same manner as in Embodiment 1. The three-cell unit obtained was operated with an output current density of 300 mA/cm$^2$ in the same way as in Embodiment 1. A stable output voltage continued for not shorter than 1,000 minutes. That is, it was confirmed that the water generated by the electrode reaction and the condensed water can be removed through the coarse regions on the electrode layer.

EMBODIMENT 4

In the present embodiment, there will be explained a method of facilitating the removal of water generated on the catalytic layers by forming holes therethrough.

Carbon unwoven fabrics were uniformly water repellent finished by dipping in the same aqueous dispersion of fluorocarbon resin powder as used in Embodiment 1. Then, a plurality of fine through holes were formed in the carbon unwoven fabrics using a carbonic acid gas laser. Four kinds of three-cell units were assembled using the unwoven fabrics, each with a different hole size and hole arrangement, in the same manner as in Embodiment 1. Cell unit "A" was assembled using the carbon unwoven fabrics with 3 to 5 holes/cm$^2$, each 50 μm in diameter, cut randomly on the surface. Cell unit "B" was assembled using the carbon unwoven fabrics on which 50 μm-diameter holes were formed along the center line of the opposite gas channel of the separator plate at an interval of 3 mm. Cell unit "C" was assembled using the same carbon unwoven fabrics as used in Cell unit "A" but has the hole diameter of 100 μm. Cell unit "D" was assembled using the same carbon unwoven fabric as used in Cell unit "B" but has the hole diameter of 100 μm. It is noted that the hole diameter was so chosen as to be some 10 times the diameter of the carbon fiber used in the carbon unwoven fabric.

The four kinds of three-cell units were tested with regard to the change with time in characteristics. The results are illustrated in FIG. 3.

Figure 3:
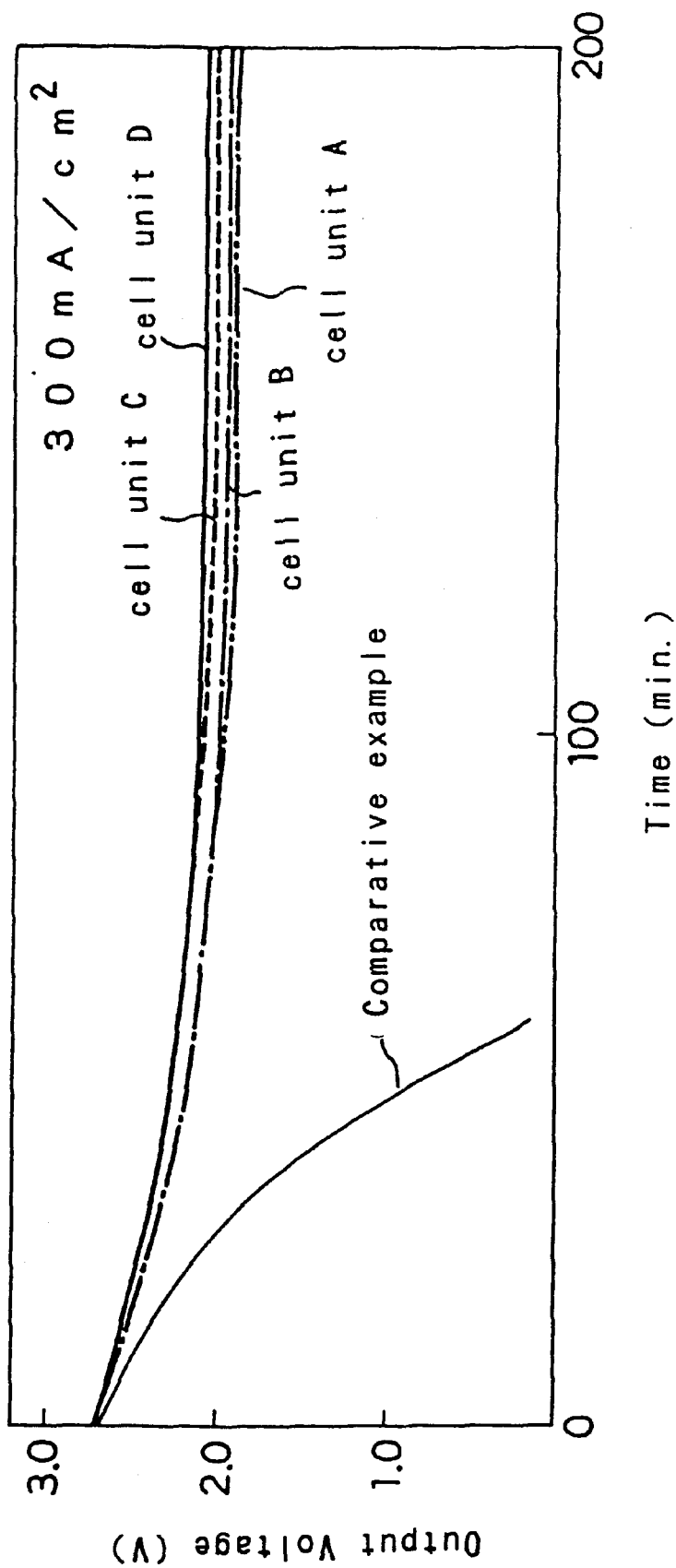
FIG. 3 is a characteristics diagram showing a change with time in an output voltage of a polymer electrolyte fuel cell in another embodiment of the present invention.

As shown in FIG. 3, all of the three-cell units in the present embodiment exhibited a long and stable output voltage unlike the comparative cell units using unwoven fabrics with no perforated hole. FIG. 3 shows the characteristics changes at a current density of 300 mA/cm$^2$, a hydrogen utilization of 60% and an air utilization of 20%.

When the three-cell units were tested at a current density of 500 mA/cm$^2$ with a hydrogen utilization of 60%, especially good results were obtained with Cell unit "B" and Cell unit "D" which had been assembled with the carbon unwoven fabrics on which the through holes were formed regularly along the center line of the gas channels of the opposite separator plate. It was also indicated that Cell unit "C" with the fabrics with 100 μm-diameter holes gave better results than Cell unit "D" with the unwoven fabric with 50 μm-diameter holes. That is probably because with rise in current density or utilization, the flow velocity of the gas that carries away water decreases in relation to the generation rate of water to be removed, and large holes can eliminate the water more efficiently.

EMBODIMENT 5

In the present embodiment, there will be explained a method of facilitating the discharging the water generated on the catalytic layer out of the unit by applying vibration to the cell.

Three cells of the prior art used as comparison example in Embodiment 1 were piled. A pair of metal end plates were provided on the both ends of this laminate. The end plates were then connected to each other via connecting members so as to compress the cells. Thus a three-cell unit (with an electrode area of 100 cm$^2$) was obtained. The three-cell unit thus obtained was mounted on a mechanical vibrator stand and then vibrated continuously or intermittently at a rate of 1 to 50 cycles per second.

Separately, to apply vibration of a higher frequency, an ultrasonic vibration plate employing an ultrasonic piezoelectric transducer (output of 50 W) was screwed to the end plates of a similar three-cell unit. As an electrically insulating plate, an acrylic resin plate which was right, hard and low in sound wave attenuation was interposed between the end plate and the three-cell unit in order to use the ultrasonic efficiently for eliminating the generated water. An electric circuit to adjust the magnitude and output time of the ultrasonic piezoelectric transducer was also mounted on an ultrasonic piezoelectric transducer.

The three-cell unit was supplied with a hydrogen gas and an air in such a way that the utilization of the hydrogen gas on the anode side was 60% and the air utilization on the cathode side was 20%. A temperature controller and a humidifier were provided on each gas supply unit, which were so set that the temperature of the supply gas was identical with that of the cell and the dew point of the supply gas was 15 to 35° C. lower than the temperature of the cell unit.

Figure 4:
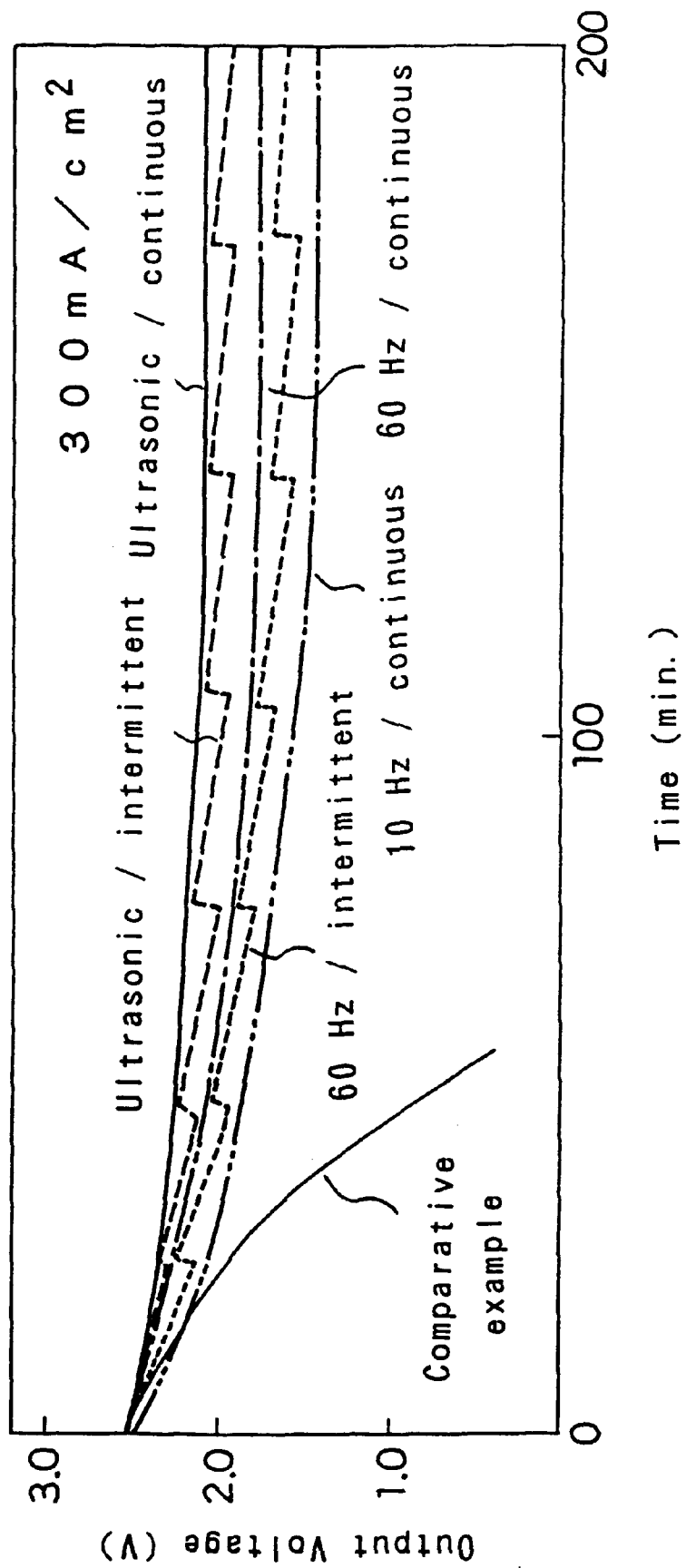
FIG. 4 is a characteristics diagram showing a change with time in an output voltage of a polymer electrolyte fuel cell in still another embodiment of the present invention.

FIG. 4 shows the changes in the output voltage of the three-cell units provided with the vibrator during a relatively short time period.

As outputting continued at a current density of 300 mA/cm$^2$, the output voltage of the three-cell unit of the comparative example with no vibrator dropped sharply 30 minutes after start of operation, and the three-cell unit was exhausted some 60 minutes later. It is shown in comparison that the three-cell units of the present embodiment all improved in performance as vibration was applied. The prior three-cell unit as the comparative example continued to fall in output voltage with the lapse of time. On the other hand, the three-cell units of the present embodiment which were vibrated on the vibration stand fell in performance in the initial stage but reached a normal state in certain stages. This effect was more remarkable with a higher vibration frequency. The system of applying vibration of a relatively low frequency on such a mechanical vibrator stand, it appears, is not so effective in removing the water which blocks the gas permeable pores on the electrode but can effectively eliminate the water which overflows and blocks the gas channels.

Applying ultrasonic to the three-cell unit was very effective in facilitating the removal of the water. Especially the three-cell unit which was subjected to continuous ultrasonic vibration showed little fall in performance from immediately after the start of operation. This indicates that vibrations of a high frequency are more effective in eliminating the water which blocks the gas permeable pores on the electrode. It was also found that the performance of the three-cell unit in which the ultrasonic piezoelectric transducer was activated on and off or intermittently fell slightly when the piezoelectric transducer was stopped but soon recovered after the transducer was restarted. Considering the energy efficiency, noise, mechanical wear of the cell unit by vibration and other factors, therefore, the system of activating the piezoelectric transducer intermittently is more attractive for practical application.

EMBODIMENT 6

In the present embodiment, there will be explained a method of facilitating the removal of the water stagnating around the catalytic layers and the electrode layers by intermittently increasing the pressure of the gas supplied to the cell.

A three-cell unit (with an electrode area of 100 cm$^2$) assembled by piling three of the same cells as used as comparison example in Embodiment 1 was mounted with a cylinder pump (cylinder volume of 1,000 cm$^3$) to a gas pipe for supplying the anode gas and to the other gas pipe for supplying the cathode gas so that each gas taken in the cylinder pump could be discharged into the gas pipe instantly and intermittently. In addition, a gas check valve was mounted on the upstream side of cylinder pump on each gas pipe, so that pressure might be effectively felt in the three-cell unit with no reverse flow of the gas discharged from the cylinder pump. A pressure sensor was provided near each joint to the cell unit, and an electrical drive unit interlocked with the pressure sensor for driving the cylinder pump to apply pressure on the gas was mounted on the cylinder pump.

The three-cell unit equipped with that pressure application unit was tested to examine the change with time in characteristics. When the pressure application unit was not activated, the three-cell units of the present embodiment fell in performance too much to run any more some 60 minutes after the start in the continuous operation at a current density of 300 mA/cm$^2$ as in the case with the prior three-cell unit. But when a pressure of 5,000 to 10,000 Pa was applied for 0.5 seconds at an interval of 10 minutes, the three-cell units recovered the original performance each time. This indicates that intermittent compression of the supply gas increased temporarily the flow velocity of the gas flowing in the catalytic layers and the electrode layers, thereby eliminating the stagnating water.

In the above embodiment, the application of pressure on the anode side was synchronized with that on the cathode side in consideration of possible damages on the cell such as breakage of the film. But the two sides can be compressed independently of each other. Also, the application of pressure can be confined to the anode side or the cathode side alone with good results.

As to the time of applying pressure, it was found that 0.5 to 1.0 seconds was enough for the three-cell units used in the above embodiment to recover the original output characteristics. It appears that the time depends on the internal configuration of the cell system. Therefore, the duration of applying pressure is freely chosen for different cell unit configurations. The pressure to be applied is also decided on taking into consideration the internal structure of the cell unit and other factors.

In the present embodiment, it is further noted, a gas cylinder pump was used as means for applying pressure. Other means can be used instead, including a system consisting of an auxiliary gas cylinder and an electromagnetic valve.

As described, the present invention can effectively remove out of the cell unit the water stagnating around the catalytic layers and the electrode layers of the fuel cell, ensuring smooth supply of oxygen to the reaction area on the catalytic layers. Thus, the present invention provides a fuel cell which can maintain the performance at a high level for a long time.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte fuel cell comprising:
   a plurality of assemblies, each assembly including a polymer electrolyte film with hydrogen ion conductivity and an electrode layer on opposite sides of said polymer electrolyte film thereby sandwiching said polymer electrolyte film therebetween; and
   a plurality of electrically conductive separators, each separator being piled alternatively with said assembly and including a gas supply channel to supply a gas to said electrode layer and a gas outlet channel for discharging a gas form said electrode layer,
   said electrode layer comprises at least one porous base area with water repellency and at least one penetration area higher in water permeability than in said base area wherein said electrode layer has ununiform water permeability throughout said electrode.

2. The polymer electrolyte fuel cell in accordance with claim 1, wherein said electrode layer is mainly composed of said porous base area and a plurality of said penetration areas are scattered over said base area.

3. The polymer electrolyte fuel cell in accordance with claim 1, wherein said penetration area is formed through said electrode layer.

4. The polymer electrolyte fuel cell in accordance with claim 3, wherein said penetration area is cylindrical in shape having a diameter from 0.02 mm to 1 mm.

5. The polymer electrolyte fuel cell in accordance with claim 1, wherein said penetration area is made of a hydrophilic porous material and said base areas is made of a porous material provided with water repellency.

6. The polymer electrolyte fuel cell in accordance with claim 5, wherein said water repellency is provided by coating with a water repellent agent containing a fluorocarbon resin.

7. The polymer electrolyte fuel cell in accordance with claim 1, wherein said penetration area comprises holes formed by perforating said electrode layer.

8. The polymer electrolyte fuel cell in accordance with claim 7, wherein said holes are 50–100 $\mu$m in diameter with 3 to 5 holes/cm$^2$.

9. The polymer electrolyte fuel cell in accordance with claim 1, wherein said penetration area is provided at a portion on said electrode layer facing to said gas supply channel or said gas outlet channel of the opposite electrically conductive separator.

10. The polymer electrolyte fuel cell in accordance with claim 1, wherein said penetration area comprises a water repellent pore larger in diameter than those on said base area.

11. The polymer electrolyte fuel cell in accordance with claim 1, wherein the areas of water repellency of said porous base area are scattered regions 30 $\mu$m or more in width.

12. A polymer electrolyte fuel cell comprising an electric generator including:
   a plurality of assemblies, each assembly including a polymer electrolyte film with hydrogen ion conductivity and a pair of electrode layers sandwiching said polymer electrolyte film therebetween; and
   a plurality of electrically conductive separators, each separator being piled alternatively with said assembly and including a gas supply channel to supply a gas to said electrode layer and a gas outlet channel for discharging a gas from said electrode layer,
   and further comprising a vibrator for applying vibration to said electric generator.

13. The polymer electrolyte fuel cell in accordance with claim 12, wherein said vibrator is an ultrasonic vibrator arranged in contact with said electric generator.

14. The polymer electrolyte fuel cell in accordance with claim 13, wherein said ultrasonic vibrator produces said vibration intermittently or interlocked with an output of said electric generator.

15. A polymer electrolyte fuel cell comprising an electric generator including:

a plurality of assemblies, each assembly including a polymer electrolyte film with hydrogen ion conductivity and a pair of electrode layers sandwiching said polymer electrolyte film therebetween; and a plurality of electrically conductive separators, each separator being piled alternately with said assembly and including a gas supply channel to supply a gas to said electrode layer and a gas outlet channel for discharging a gas from said electrode layer, and further comprising a gas compressor for intermittently compressing said gas to be supplied to said gas supply channel.

16. A polymer electrolyte fuel cell comprising at least one assembly comprising a polymer electrolyte film and a pair of electrode layers sandwiching said electrolyte film therebetween, and a separator including at least one gas supply channel and at least one gas outlet channel, each electrode layer being made of a porous hydrophilic material and having scattered regions wherein said porous material is hydrophobic.

17. The polymer electrolyte fuel cell in accordance with claim 16 wherein said scattered regions are formed by splashing said porous material with a hydrophobic resin and heating said material.

18. The polymer electrolyte fuel cell in accordance with claim 16, wherein said scattered regions are formed by scattering a paraffin powder over a surface of said porous material, heating to melt the paraffin powder on said surface and to penetrate into the porous material, coating the material with a hydrophobic resin, heating said porous material to remove the melted paraffin from said porous material whereby the areas not coated by the paraffin are hydrophilic and the areas coated with the hydrophobic resin are hydrophobic.

19. The polymer electrolyte fuel cell in accordance with claim 16, wherein said scattered regions are formed by uniformly coating said porous material with a hydrophobic resin, loosening the coated porous material into small pieces, nixing the small pieces with binder to form a solution, stirring the solution, and refabricating the porous material.

* * * * *